(12) United States Patent
McCorkendale et al.

(10) Patent No.: US 7,516,150 B1
(45) Date of Patent: Apr. 7, 2009

(54) UPDATE PROTECTION SYSTEM AND METHOD

(75) Inventors: Bruce McCorkendale, Manhattan Beach, CA (US); William E. Sobel, Stevenson Ranch, CA (US); Peter Szor, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 526 days.

(21) Appl. No.: 10/978,051

(22) Filed: Oct. 29, 2004

(51) Int. Cl.
*G06F 17/00* (2006.01)

(52) U.S. Cl. .............................. 707/102; 707/9; 707/10; 707/200; 707/203

(58) Field of Classification Search ........................ None
See application file for complete search history.

(56) References Cited

U.S. PATENT DOCUMENTS

| | | | | |
|---|---|---|---|---|
| 5,948,104 | A | | 9/1999 | Gluck et al. ................. 713/200 |
| 6,035,423 | A | | 3/2000 | Hodges et al. ................ 714/38 |
| 6,199,204 | B1 | * | 3/2001 | Donohue ..................... 717/178 |
| 6,202,207 | B1 | * | 3/2001 | Donohue ..................... 717/173 |
| 6,263,364 | B1 | * | 7/2001 | Najork et al. ............... 709/217 |
| 6,725,377 | B1 | | 4/2004 | Kouznetsov ................. 713/201 |
| 6,832,373 | B2 | * | 12/2004 | O'Neill ....................... 717/171 |
| 6,854,074 | B2 | * | 2/2005 | McLellan et al. ............. 714/39 |
| 6,976,271 | B1 | | 12/2005 | Le Pennec et al. ............ 726/24 |
| 7,076,655 | B2 | * | 7/2006 | Griffin et al. ................ 713/164 |
| 7,103,641 | B2 | * | 9/2006 | Brannock .................... 709/217 |
| 7,149,946 | B2 | * | 12/2006 | Peretz et al. ................. 714/758 |
| 7,257,841 | B2 | | 8/2007 | Naitoh ......................... 726/24 |
| 7,290,282 | B1 | * | 10/2007 | Renert et al. .................. 726/24 |
| 2001/0029178 | A1 | * | 10/2001 | Criss et al. .................. 455/419 |
| 2002/0120725 | A1 | * | 8/2002 | DaCosta et al. ............. 709/221 |
| 2003/0188160 | A1 | * | 10/2003 | Sunder et al. ............... 713/165 |
| 2004/0117640 | A1 | * | 6/2004 | Chu et al. .................... 713/188 |
| 2005/0201371 | A1 | * | 9/2005 | Lauer .......................... 370/389 |
| 2006/0075001 | A1 | * | 4/2006 | Canning et al. ............. 707/203 |
| 2006/0130037 | A1 | * | 6/2006 | Mackay ...................... 717/168 |

OTHER PUBLICATIONS

William E. Sobel et al., U.S. Appl. No. 10/928,687, filed Aug. 26, 2004, entitled "Alternated Update System and Method".
"Registering a Domain Name", pp. 1-3 [online]. Retrieved on Aug. 12, 2004. Retrieved from the Internet:<URL:http://www.webopedia.com/DidYouKnow/Internet/2002/DomainRegister.asp>. No author provided.
"DNS", pp. 1-4 [online]. Retrieved on Aug. 10, 2004. Retrieved from the Internet:<URL:http://www.webopedia.com/TERM/d/DNS.html>. No author provided.

(Continued)

*Primary Examiner*—Christian P. Chace
*Assistant Examiner*—Bai D Vu
(74) *Attorney, Agent, or Firm*—Gunnison, McKay & Hodgson, L.L.P.; Serge J. Hodgson (57) ABSTRACT

A method includes determining that an entire update name list has been attempted and obtaining a verified IP address from a success history file. The success history file includes verified IP addresses of computer systems from which update information has previously been successfully obtained. The method further includes obtaining update information from a computer system located at the verified IP address.

18 Claims, 2 Drawing Sheets

OTHER PUBLICATIONS

"Understanding IP Addressing", pp. 1-3 [online]. Retrieved on Aug. 10, 2004. Retrieved from the Internet:<URL:http://www.webopedia.com/DidYouKnow/Internet/2002/IPaddressing.asp>. No author provided.

"IP address", pp. 1-3 [online]. Retrieved on Aug. 10, 2004. Retrieved from the Internet:<URL:http//www.webopedia.com/TERM/I/IP_address.html>. No author provided.

"Domain name", pp. 1-3 [online]. Retrieved on Aug. 10. 2004. Retrieved from the Internet:<URL:http//www.webopedia.com/TERM/d/domain_name.html>. No author provided.

"What is the Hosts file?", pp. 1-2 [online]. Retrieved on May 3, 2004. Retrieved from the Internet:<URL:http://www.accs-net.com/hosts/what_{13} is_hosts.html>. No author provided.

"How to Update", pp. 1-2 [online]. Retrieved on Sep. 22, 2008 from the Internet: <URL:http//www.safer-networking.org/en/howto/update.html>. No author provided.

"Using Spybot—Search & Destroy to remove Spyware from your Computer", pp. 1-13 [online]. Retrieved on Sep. 19, 2008 from the Internet:<URL:http://www.bleepingcomputer.com/tutorials/tutorial43.html>. No author provided.

* cited by examiner

UPDATE PROTECTION SYSTEM AND METHOD

BACKGROUND OF THE INVENTION

1. Field of the Invention

The present invention relates to the protection of computer systems. More particularly, the present invention relates to a method and apparatus for obtaining updates on computer systems.

2. Description of Related Art

Security applications such as anti-virus applications rely upon updates from security vendor update sites. These updates are an essential component of the security applications. For example, as new viruses are created, new virus definitions are distributed as an update to allow for detection of the new viruses.

Recognizing the importance of updates to security applications, new generations of malicious code, e.g., W32.Yaha, W32.Cone, W32.HLLW.Polybot, block access to security vendor update sites by maliciously modifying the hosts file. Specifically, new generations of malicious code manage to block access to update sites by modifying the "hosts" file such that the names used by the security applications to find update sites resolve incorrectly. Usually, names are resolved to addresses using the Domain Name System (DNS); however, the hosts file can be used to override DNS resolution. Thus, malicious code can prevent security applications from obtaining updates through malicious modifications to the hosts file.

If successful in blocking access, the malicious code defeats the ability of the security applications to access and download updates from the security vendor update sites. In this manner, the malicious code reduces or eliminates the effectiveness of the security applications in protecting the host computer system.

SUMMARY OF THE INVENTION

In accordance with one embodiment, a method includes determining that an entire update name list has been attempted and obtaining a verified IP address from a success history file. The success history file includes verified IP addresses of computer systems from which update information has previously been successfully obtained. The method further includes obtaining update information from a computer system located at the verified IP address.

Thus, as set forth above, even if malicious code is able to defeat downloading of update information from all of the update names of the update name list, the update information is nevertheless obtained by resorting to IP addresses from which update information has previously been successfully obtained.

For example, malicious code has maliciously modified the hosts file on the host computer system or otherwise misdirected the host computer system, e.g., is preventing successful DNS resolution of the update names on the update name list, to prevent the host computer system from reaching an update site. However, in one embodiment, the host computer system accesses the update site from which update information has most recently been obtained by using the most recent verified IP address from the success history file. The downloaded update information is then used to remove the malicious code on the host computer system, and thus restore DNS resolution of the update names on the update name list.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

An IP (Internet Protocol) address is an identifier for a computer or device on a TCP/IP (Transmission Control Protocol/Internet Protocol) network. Networks using the TCP/IP protocol route messages based on the IP address of the destination. The format of an IP address is typically a 32-bit numeric address written as four numbers separated by periods. For example, 127.0.0.1 could be an IP address.

However, IP addresses are difficult for humans to remember. Thus, for the convenience of humans, domain names are commonly used instead of IP addresses.

A domain name is a name that identifies one or more IP addresses. For example, the domain name Symantec.com represents one or more IP addresses. The domain names are commonly used in URLs (Uniform Resource Locators) to identify particular web pages. For example, in the URL http://www.Symantec.com/index.html, the domain name is Symantec.com Because the Internet is based on IP addresses, not domain names, every WebServer requires a DNS (domain name system) server to translate domain names into IP addresses. For example, the domain name YourDomain.com might resolve to (translate to) 192.168.150.196.

To allow DNS servers to translate a domain name into an IP address, a domain name must be registered using an accredited registrar. Once registered, the domain name is placed into a domain name database that is used by DNS servers, sometimes called internet DNS servers or global DNS servers, to translate domain names into IP addresses.

In one embodiment, a local administrator is an accredited registrar. To illustrate, an internal DNS server, sometimes called an intranet DNS server, resolves domain names into IP addresses. By registering domain names with a local administrator of a local network, domain names are resolved locally.

Generally, the host computer, sometimes called a host computer system, generates a DNS query to a DNS server, e.g., an intranet or internet DNS server, to translate the domain name into the IP address. The response to the DNS query, if successfully resolved, returns the IP address of the host site associated with the domain name.

The "Hosts" file on a host computer allows domain names that are not officially registered with an accredited registrar to be resolved and it allows for an alternate resolution of a registered domain name, i.e., it allows for local override of DNS resolution. On a NT class WINDOWS® operating system, the Hosts file is located in the % System %\drivers\etc\hosts file. On most Unix based systems, the Hosts file is /etc/hosts. A hosts file, or something of similar functionality exists on nearly every operating system.

The hosts file is similar to an address book. The hosts file includes domain names, sometimes called host names, and the associated IP addresses. If the hosts file contains the domain name, the host computer system goes to the host site, i.e., accesses the site specified by the IP address, using the IP address resolved from the hosts file.

Host computers have a host address of their own, it is known as the "localhost" IP address, typically with an IP address of 127.0.0.1. More particularly, a host computer uses the IP address of 127.0.0.1 to refer to itself.

If a domain name of a host site is associated with the localhost IP address (or any other incorrect address for that host site) in the hosts file, the host site is effectively blocked because all attempts to access the host site will lead back to the host computer system (or the other incorrect address). More particularly, the domain name of the host site will be resolved to be the localhost IP address using the hosts file. The host computer will be redirected back to itself instead of to the host site, effectively blocking access to the host site.

Recognizing this usage of the hosts file, malicious code, e.g., worms such as W32.Yaha, W32.Cone, W32.HLLW.Polybot, attempt to maliciously modify the hosts file in an attempt to block access to security vendor sites, sometimes called update sites. If successful in blocking access to security vendor sites, the malicious code defeats the ability of the host computer system, e.g., security applications executing thereon, to access and download updates, sometimes called malicious code protection update information or just update information, from the security vendor sites.

For example, the NORTON INTERNET SECURITY™ product includes a LIVEUPDATE™ system that automatically downloads updates, e.g., new virus definitions. The LIVEUPDATE™ system uses URLs that include domain names placed in a default update settings file. For example, the URLs include liveupdate.symantecliveupdate.com and update.Symantec.com/opt/content/onramp.

Malicious code, e.g., W32.HLLW.Polybot, attempt to maliciously modify the hosts file by attempting to add at least the following entries:

127.0.0.1 liveupdate.symantecliveupdate.com; and 127.0.0.1 update.Symantec.com;

in an attempt to block the LIVEUPDATE™ system from automatically downloading updates from liveupdate.symantecliveupdate.com and update.Symantec.com.

For example, assume the case where malicious code is successful in maliciously modifying the hosts file to add the entries:

127.0.0.1 liveupdate.symantecliveupdate.com; and 127.0.0.1 update.Symantec.com.

In this example, when the LIVEUPDATE™ system goes to download updates from liveupdate.symantecliveupdate.com, the host computer system is redirected back to itself thus defeating the download. The LIVEUPDATE™ system then attempts to download updates from update.Symantec.com as an alternative to liveupdate.symantecliveupdate.com. Again, the host computer system is redirected back to itself thus defeating the download. As a net result, the host computer system is unable to download the updates.

Although specific examples of blocking access to a host site by using the localhost IP address of 127.0.0.1 are set forth herein, any IP address that does not map to the host site, sometimes called a misleading IP address, can be inserted in the hosts file to block access. More particularly, instead of downloading updates, the host computer system is redirected to the misleading IP address thus defeating the download. For example, a misleading IP address of 0.0.0.0 is sometimes used by malicious code.

Further, in another example, foistware, sometimes called spyware, blocks access to a host site. This foistware redirects the host computer system to a misleading IP address thus defeating the download. The redirection can occur as a result of a plug-in module on the host computer system or otherwise by a DNS resolution to a misleading IP address.

Figure 1:
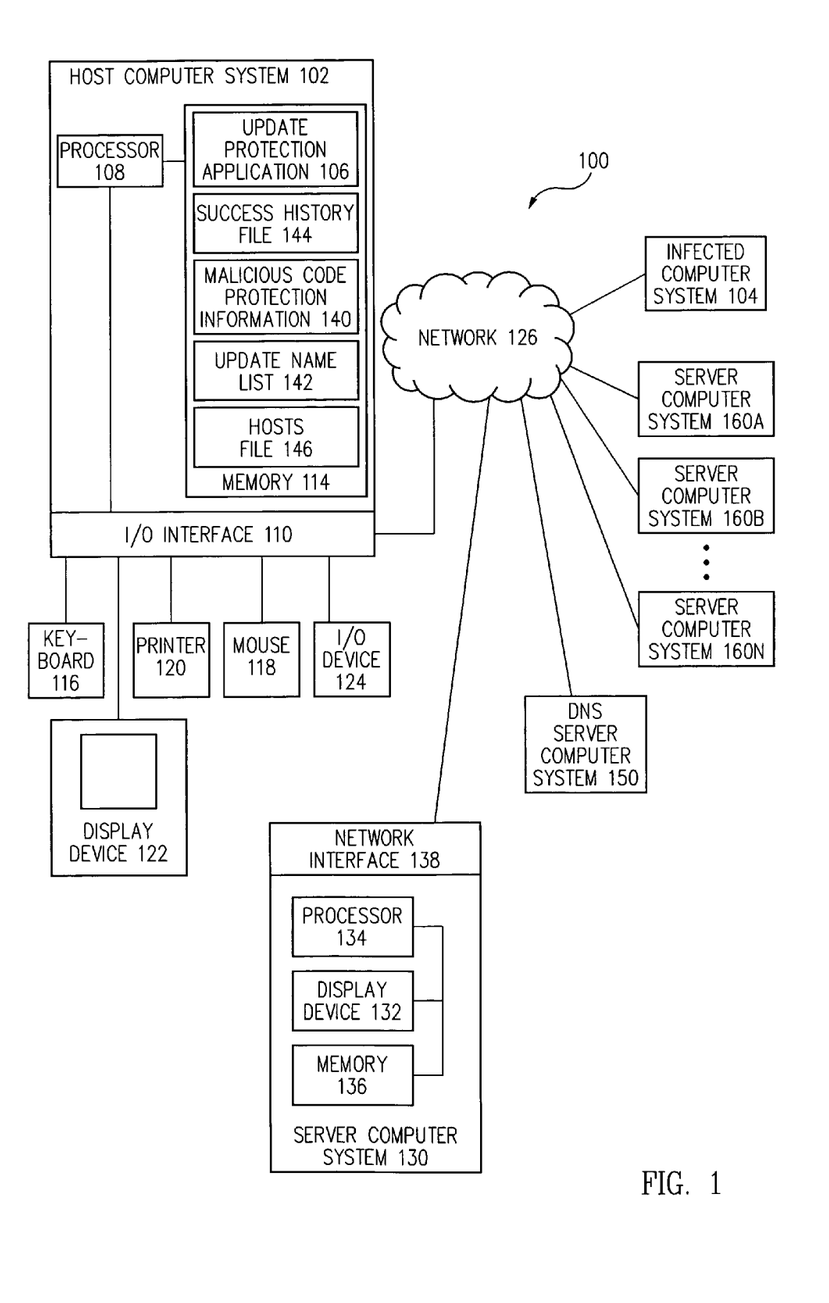
FIG. 1 is a diagram of a client-server system that includes an update protection application executing on a host computer system in accordance with one embodiment of the present invention.

FIG. 1 is a diagram of a client-server system 100 that includes an update protection application 106 executing on a host computer system 102, e.g., a first computer system, in accordance with one embodiment of the present invention.

Host computer system 102, sometimes called a client or user device, typically includes a central processing unit (CPU) 108, hereinafter processor 108, an input output (I/O) interface 110, and a memory 114. In one embodiment, host computer system 102 includes a Windows® operating system.

Memory 114 includes malicious code protection information 140. Malicious code protection information 140 includes information used by security applications, for example, includes virus definitions.

Further, memory 114 includes an update name list 142. Generally, update name list 142 includes at least one update name, e.g., includes a single update name or a list of update names. An update name is a domain name of a site, sometimes called an update site, e.g., a web (HTTP) site, FTP site or UNC/file sharing site, from which malicious code protection update information can be obtained.

Malicious code protection update information, sometimes called a manifest file, updates malicious code protection information 140. For example, malicious code protection information 140 is out-of-date and does not include virus definitions for the latest threats. Malicious code protection update information includes new virus definitions for the latest threats. The malicious code protection update information is downloaded to update malicious code protection information 140 on host computer system 102 with the virus definitions for the latest threats.

Memory 114 further includes a success history file 144, sometimes called a success history cache. Success history file 144 is a file for storage of verified IP addresses. In one embodiment, a verified IP address is an IP address from which malicious code protection update information has been successfully obtained.

Success history file 144 also contains timestamps associated with the verified IP addresses in one embodiment. A time stamp is an entry into success history file 144 of when the verified IP address was last successfully used.

In one embodiment, the length of success history file 144 is configurable. For example, success history file 144 is a circular buffer which holds a select number of records and overwrites old records as new records are added.

Memory 114 further includes a hosts file 146. Hosts file 146 includes domain names, sometimes called host names, and the associated IP addresses. Hosts files such as hosts file 146 are well known to those of skill in the art.

Host computer system 102 may further include standard devices like a keyboard 116, a mouse 118, a printer 120, and a display device 122, as well as, one or more standard input/output (I/O) devices 124, such as a compact disk (CD) or DVD drive, floppy disk drive, or other digital or waveform port for inputting data to and outputting data from host computer system 102. In one embodiment, update protection application 106 is loaded into host computer system 102 via I/O device 124, such as from a CD, DVD or floppy disk containing update protection application 106.

Host computer system 102 is coupled to a server computer system 130 of client-server system 100 by a network 126. Server computer system 130 typically includes a display device 132, a processor 134, a memory 136, and a network interface 138.

Further, host computer system 102 is also coupled to an infected computer system 104, server computer systems 160A, 160B, . . . 160N, and a DNS server computer system 150 by network 126. In one embodiment, infected computer system 104, server computer systems 160A, 160B, . . . 160N, and DNS server computer system 150 are similar to host computer system 102 and/or server computer system 130, for example, include a central processing unit, an input output (I/O) interface, and a memory.

Infected computer system 104, server computer systems 160A, 160B, . . . 160N, and DNS server computer system 150 may further include standard devices like a keyboard, a mouse, a printer, a display device and an I/O device(s). The various hardware components of infected computer system 104, server computer systems 160A, 160B, . . . 160N, and DNS server computer system 150 are not illustrated to avoid detracting from the principles of the invention.

Illustratively, malicious code is propagated from infected computer system 104 to host computer system 102. In one embodiment, malicious code is defined as any computer program, module, set of modules, or code that enters a computer system without an authorized user's knowledge and/or without an authorized user's consent.

Network 126 can be any network or network system that is of interest to a user. In various embodiments, network interface 138 and I/O interface 110 include analog modems, digital modems, or a network interface card.

Update protection application 106 is stored in memory 114 of host computer system 102 and executed on host computer system 102. The particular type of and configuration of host computer system 102, infected computer system 104, server computer systems 160A, 160B, . . . 160N, DNS server computer system 150, and server computer system 130 are not essential to this embodiment of the present invention.

Figure 2:
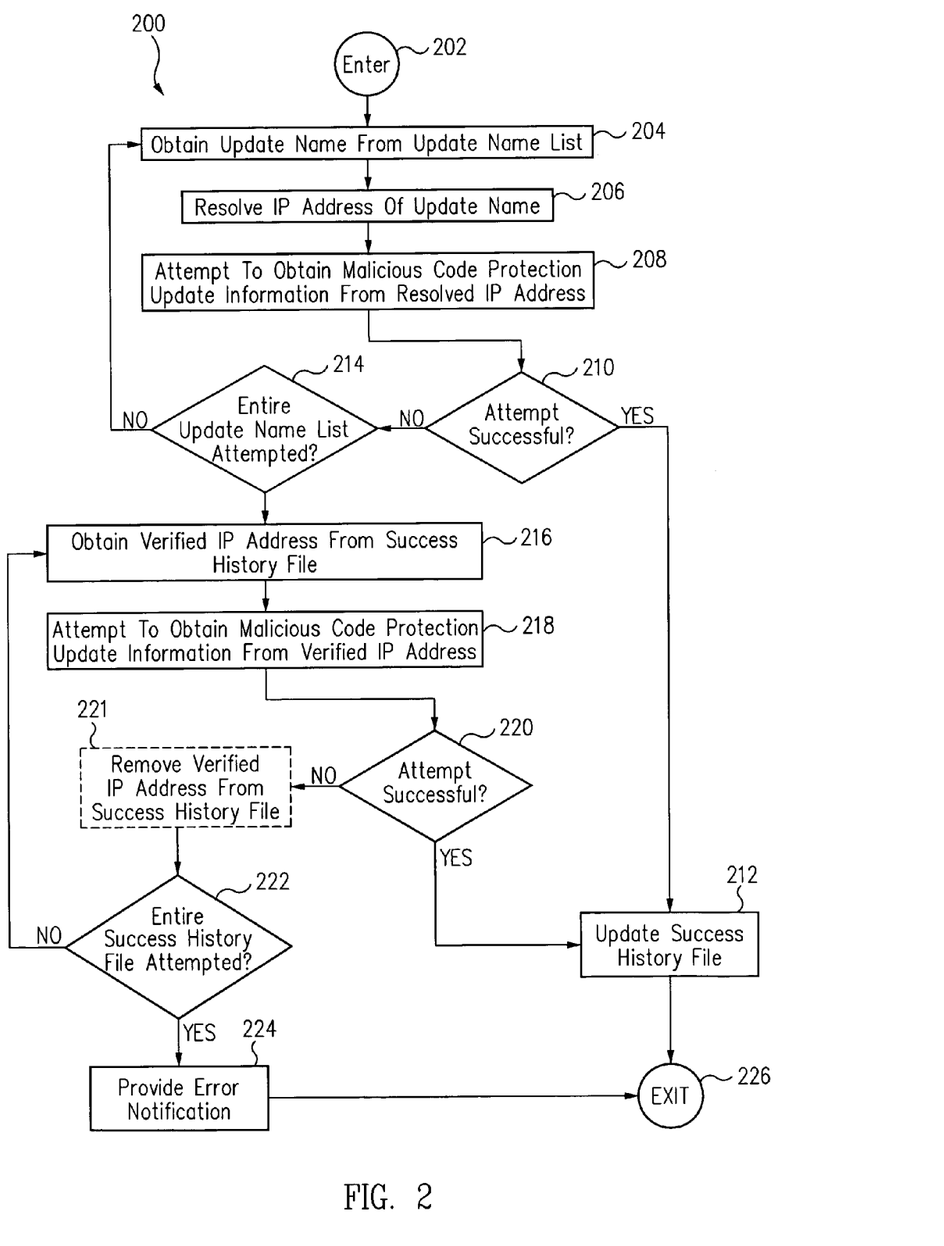
FIG. 2 is a flow diagram of a host computer process in accordance with one embodiment of the present invention.

FIG. 2 is a flow diagram of a host computer process 200 in accordance with one embodiment of the present invention. Referring now to FIGS. 1 and 2 together, execution of update protection application 106 by processor 108 results in the operations of host computer process 200 as described below in one embodiment.

From an ENTER OPERATION 202, flow moves to an OBTAIN UPDATE NAME FROM UPDATE NAME LIST OPERATION 204. In OBTAIN UPDATE NAME FROM UPDATE NAME LIST OPERATION 204, an update name from update name list 142 is obtained. Illustratively, a first update name from the list of update names of update name list 142 is selected, randomly or in order, in OBTAIN UPDATE NAME FROM UPDATE NAME LIST OPERATION 204.

From OBTAIN UPDATE NAME FROM UPDATE NAME LIST OPERATION 204, flow moves to a RESOLVE IP ADDRESS OF UPDATE NAME OPERATION 206. In RESOLVE IP ADDRESS OF UPDATE NAME OPERATION 206, the IP address of the update name obtained in OBTAIN UPDATE NAME FROM UPDATE NAME LIST OPERATION 204 is resolved. Illustratively, a DNS query is sent to DNS server computer system 150 to resolve the IP address of the update name. If successfully resolved, DNS server computer system 150 returns the IP address associated with the update name to host computer system 102.

From RESOLVE IP ADDRESS OF UPDATE NAME OPERATION 206, flow moves to an ATTEMPT TO OBTAIN MALICIOUS CODE PROTECTION UPDATE INFORMATION FROM RESOLVED IP ADDRESS OPERATION 208. In ATTEMPT TO OBTAIN MALICIOUS CODE PROTECTION UPDATE INFORMATION FROM RESOLVED IP ADDRESS OPERATION 208, an attempt to obtain malicious code protection update information from the IP address resolved in RESOLVE IP ADDRESS OF UPDATE NAME OPERATION 206 is made. Although attempts to obtain malicious code protection update information from IP addresses are discussed herein, in light of this disclosure, those of skill in the art will understand this to include attempts to obtain malicious code protection update information from computer systems such as server computer systems 160A, 160B, 160N specified by (located at) the IP addresses.

As set forth above, the malicious code protection update information includes information used by security applications, for example, includes new virus definitions.

From ATTEMPT TO OBTAIN MALICIOUS CODE PROTECTION UPDATE INFORMATION FROM RESOLVED IP ADDRESS OPERATION 208, flow moves to an ATTEMPT SUCCESSFUL CHECK OPERATION 210. In ATTEMPT SUCCESSFUL CHECK OPERATION 210, a determination is made as to whether the attempt to obtain malicious code protection update information in ATTEMPT TO OBTAIN MALICIOUS CODE PROTECTION UPDATE INFORMATION FROM RESOLVED IP ADDRESS OPERATION 208 is successful.

In one embodiment, if the malicious code protection update information is obtained, sometimes called retrieved or downloaded, a determination is made that the attempt to obtain malicious code protection update information is successful in ATTEMPT SUCCESSFUL CHECK OPERATION 210.

In another embodiment, if both the malicious code protection update information is obtained and the integrity of the malicious code protection update information is verified, a determination is made that the attempt to obtain malicious code protection update information is successful in ATTEMPT SUCCESSFUL CHECK OPERATION 210. Stated another way, in ATTEMPT SUCCESSFUL CHECK OPERATION 210, a determination is made as to: (1) whether the malicious code protection update information is obtained; and (2) whether the integrity of the malicious code protection update information is verified, i.e., whether the state of the malicious code protection update information as being unmodified is proven to be true.

In one embodiment, if the signature, e.g., the digital signature, of the sender of the malicious code protection update information, e.g., one of server computer systems 160A, . . . , 160N, matches the signature stored on host computer system 102, e.g., part of malicious code protection information 140, the integrity of the malicious code protection update information is verified. Stated another way, if the signature of the sender of the malicious code protection update information is valid, the integrity of the malicious code protection update information is verified.

In accordance with this embodiment, if the malicious code protection update information is not obtained or if the signature does not match, a determination is made that the attempt to obtain malicious code protection update information is unsuccessful in ATTEMPT SUCCESSFUL CHECK OPERATION 210.

In another embodiment, the date, sometimes called timestamp or signature, of the malicious code protection update information is checked in ATTEMPT SUCCESSFUL CHECK OPERATION 210. If the date of the malicious code protection update information falls outside of a reasonably short time period, which can be any time period from a few hours to a few days, this time period being configurable by an administrator, a determination is made that the integrity of the malicious code protection update information is not verified. More generally, if the malicious code protection update information is outdated, a determination is made that the attempt to obtain malicious code protection update information is unsuccessful in ATTEMPT SUCCESSFUL CHECK OPERATION 210.

In this manner, malicious attempts to post validly signed, but out of date malicious code protection update information, are defeated.

In another embodiment, if the hash of the malicious code protection update information is valid, a determination is made that the integrity of the malicious code protection update information is verified.

If a determination is made that the attempt is successful in ATTEMPT SUCCESSFUL CHECK OPERATION 210, flow moves to an UPDATE SUCCESS HISTORY FILE OPERATION 212. In UPDATE SUCCESS HISTORY FILE OPERATION 212, the success history file of the host computer system is updated, e.g., success history file 144 of host computer system 102 is updated.

In one embodiment, the success history file is updated with the verified IP address from which the malicious code protection update information was successfully obtained. More particularly, a verified IP address is an IP address from which malicious code protection update information is successfully obtained. Further, in one embodiment, the success history file is also updated with a timestamp of when the malicious code protection update information was successfully obtained. The timestamp is associated with the verified IP address.

Generally, a record is added to the success history file in UPDATE SUCCESS HISTORY FILE OPERATION 212. This record includes either the verified IP address or the verified IP address and the associated timestamp. In another example, an existing record of the success history file is modified by updating the timestamp of the existing record.

From UPDATE SUCCESS HISTORY FILE OPERATION 212, flow moves to and exits at an EXIT OPERATION 226.

However, returning again to ATTEMPT SUCCESSFUL CHECK OPERATION 210, if a determination is made that the attempt to obtain malicious code protection update information is unsuccessful, flow moves from ATTEMPT SUCCESSFUL CHECK OPERATION 210 to an ENTIRE UPDATE NAME LIST ATTEMPTED CHECK OPERATION 214.

In ENTIRE UPDATE NAME LIST ATTEMPTED CHECK OPERATION 214, a determination is made as to whether the entire update name list has been attempted. More particularly, if an attempt to obtain malicious code protection update information from every update name on the update name list, e.g., update name list 142, has been unsuccessfully made, a determination is made that the entire update name list has been attempted. Conversely, if an attempt to obtain malicious code protection update information has not been made from at least one update name on the update name list, a determination is made that the entire update name list has not been attempted.

Although attempts to obtain malicious code protection update information from update names is set forth herein, in light of this disclosure, those of skill in the art will understand this to include attempts to obtain malicious code protection update information from computer systems such as server computer systems 160A, 160B, . . . , 160N specified by (located at) IP addresses associated with the update names.

If a determination is made that the entire update name list has been attempted, flow moves from ENTIRE UPDATE NAME LIST ATTEMPTED CHECK OPERATION 214 to an OBTAIN VERIFIED IP ADDRESS FROM SUCCESS HISTORY FILE OPERATION 216. Conversely, if a determination is made that the entire update name list has not been attempted, flow returns from ENTIRE UPDATE NAME LIST ATTEMPTED CHECK OPERATION 214 to OBTAIN UPDATE NAME FROM UPDATE NAME LIST OPERATION 204.

Accordingly, if an attempt to obtain malicious code protection update information has not been made from at least one update name on the update name list, an unattempted update name is selected from the update name list in OBTAIN UPDATE NAME FROM UPDATE NAME LIST OPERATION 204. In accordance with one embodiment, an unattempted update name is an update name on the update name list from which an attempt to obtain malicious code protection update information has not been made.

Operations 206, 208, 210 and 214 are repeated for each unattempted update name until a determination is made that the attempt was successful in ATTEMPT SUCCESSFUL CHECK OPERATION 210 or a determination is made that the entire update name list has been attempted in ENTIRE UPDATE NAME LIST ATTEMPTED CHECK OPERATION 214.

To illustrate, in one embodiment, the update name list consists of a first update name and a second update name. If a determination is made that the attempt to obtain malicious code protection update information from the first update name is unsuccessful in ATTEMPT SUCCESSFUL CHECK OPERATION 210, and a determination is made that an attempt to obtain malicious code protection update information from the second update name has not been made in ENTIRE UPDATE NAME LIST ATTEMPTED CHECK OPERATION 214, flow moves to OBTAIN UPDATE NAME FROM UPDATE NAME LIST OPERATION 204.

In accordance with this embodiment, the second update name is selected from the update name list. Operations 206, 208 are performed on the second update name in a manner similar to that discussed above. Upon a determination that the attempt to obtain malicious code protection update information from the second update name is unsuccessful in ATTEMPT SUCCESSFUL CHECK OPERATION 210, a determination is made that the entire update name list has been attempted in ENTIRE UPDATE NAME LIST ATTEMPTED CHECK OPERATION 214, and flow moves to OBTAIN VERIFIED IP ADDRESS FROM SUCCESS HISTORY FILE OPERATION 216.

In OBTAIN VERIFIED IP ADDRESS FROM SUCCESS HISTORY FILE OPERATION 216, a verified IP address from the success history file, e.g., success history file 144, is obtained. In one embodiment, the timestamps associated with the verified IP addresses in the success history file are read and the verified IP address with the most recent timestamp is selected. In another embodiment, the first verified IP addresses, e.g., the most recent entry, in the success history file is selected.

From OBTAIN VERIFIED IP ADDRESS FROM SUCCESS HISTORY FILE OPERATION 216, flow moves to an ATTEMPT TO OBTAIN MALICIOUS CODE PROTECTION UPDATE INFORMATION FROM VERIFIED IP ADDRESS OPERATION 218. In ATTEMPT TO OBTAIN MALICIOUS CODE PROTECTION UPDATE INFORMATION FROM VERIFIED IP ADDRESS OPERATION 218, an attempt to obtain malicious code protection update information from the verified IP address obtained in OBTAIN VERIFIED IP ADDRESS FROM SUCCESS HISTORY FILE OPERATION 216 is made.

From ATTEMPT TO OBTAIN MALICIOUS CODE PROTECTION UPDATE INFORMATION FROM VERIFIED IP ADDRESS OPERATION 218, flow moves to an ATTEMPT SUCCESSFUL CHECK OPERATION 220. In ATTEMPT SUCCESSFUL CHECK OPERATION 220, a determination is made as to whether the attempt to obtain malicious code protection update information in ATTEMPT TO OBTAIN MALICIOUS CODE PROTECTION UPDATE INFORMATION FROM VERIFIED IP ADDRESS OPERATION 218 is successful.

In one embodiment, if the malicious code protection update information is obtained, sometimes called retrieved or downloaded, a determination is made that the attempt to obtain malicious code protection update information is successful in ATTEMPT SUCCESSFUL CHECK OPERATION 220.

In another embodiment, if both the malicious code protection update information is obtained and the integrity of the malicious code protection update information is verified, a determination is made that the attempt to obtain malicious code protection update information is successful in ATTEMPT SUCCESSFUL CHECK OPERATION 220. Stated another way, in ATTEMPT SUCCESSFUL CHECK OPERATION 220, a determination is made as to: (1) whether the malicious code protection update information is obtained; and (2) whether the integrity of the malicious code protection update information is verified, i.e., whether the state of the malicious code protection update information as being unmodified, sometimes called un-tampered with, is proven to be true.

In one embodiment, if the signature, e.g., the digital signature, of the sender of the malicious code protection update information, e.g., one of server computer systems 160A, . . . , 160N, matches the signature stored on host computer system 102, e.g., part of malicious code protection information 140, the integrity of the malicious code protection update information is verified. Stated another way, if the signature of the sender of the malicious code protection update information is valid, the integrity of the malicious code protection update information is verified.

In accordance with this embodiment, if the malicious rode protection update information is not obtained or if the signature does not match, a determination is made that the attempt to obtain malicious code protection update information is unsuccessful in ATTEMPT SUCCESSFUL CHECK OPERATION 220.

In another embodiment, the date, sometimes called timestamp or signature, of the malicious code protection update information is checked in ATTEMPT SUCCESSFUL CHECK OPERATION 220. If the date of the malicious code protection update information falls outside of a reasonably short time period, which can be any time period from a few hours to a few days, this time period being configurable by an administrator, a determination is made that the integrity of the malicious code protection update information is not verified. More generally, if the malicious code protection update information is outdated, a determination is made that the attempt to obtain malicious code protection update information is unsuccessful in ATTEMPT SUCCESSFUL CHECK OPERATION 220. In this manner, malicious attempts to post validly signed, but out of date malicious code protection update information, are defeated.

In another embodiment, if the hash of the malicious code protection update information is valid, a determination is made that the integrity of the malicious code protection update information is verified.

If a determination is made that the attempt is successful in ATTEMPT SUCCESSFUL CHECK OPERATION 220, flow moves to UPDATE SUCCESS HISTORY FILE OPERATION 212, which is performed as discussed above (or alternatively moves directly to and exits at EXIT OPERATION 226). In one embodiment, success history file 144 is updated in UPDATE SUCCESS HISTORY FILE OPERATION 212 by updating the timestamp of the verified IP address from which the malicious code protection update information is obtained. In other embodiments, success history file 144 is updated in UPDATE SUCCESS HISTORY FILE OPERATION 212 by adding as a most recent entry to success history file 144 the verified IP address from which the malicious code protection update information is obtained with (or without) the timestamp.

Generally, a record of the success history file is added or modified in UPDATE SUCCESS HISTORY FILE OPERATION 212. In one embodiment, a record is added to the success history file record and this record includes either the verified IP address or the verified IP address and the associated timestamp. In another example, an existing record of the success history file is modified by updating the timestamp of the existing record.

Thus, as set forth above, even if malicious code is able to defeat downloading of malicious code protection update information from all of the update names of the update name list, the malicious code protection update information is nevertheless obtained by resorting to IP addresses from which malicious code protection update information has previously been successfully obtained.

For example, malicious code has maliciously modified the hosts file on the host computer system or otherwise misdirected the host computer system, e.g., is preventing successful DNS resolution of the update names on the update name list, to prevent the host computer system from reaching an update site. However, in one embodiment, the host computer system accesses the update site from which malicious code protection update information has most recently been obtained by using a verified IP address from the success history file. The downloaded malicious code protection update information is used to remove the malicious code on the host computer system, and thus restore DNS resolution of the update names on the update name list.

However, returning again to ATTEMPT SUCCESSFUL CHECK OPERATION 220, if a determination is made that the attempt to obtain malicious code protection update information is unsuccessful, flow moves from ATTEMPT SUCCESSFUL CHECK OPERATION 220 to, optionally, a REMOVE VERIFIED IP ADDRESS FROM SUCCESS HISTORY FILE OPERATION 221.

In REMOVE VERIFIED IP ADDRESS FROM SUCCESS HISTORY FILE OPERATION 221, the verified IP address from which the attempt to obtain malicious code protection update information was unsuccessful is removed from the success history file. In this manner, future repeated failed attempts to obtain malicious code protection update information from the verified IP address are avoided. From REMOVE VERIFIED IP ADDRESS FROM SUCCESS HISTORY FILE OPERATION 221, flow moves to an ENTIRE SUCCESS HISTORY FILE ATTEMPTED CHECK OPERATION 222.

In one embodiment, REMOVE VERIFIED IP ADDRESS FROM SUCCESS HISTORY FILE OPERATION 221 is optional and not performed. In accordance with this embodiment, upon a negative determination (NO) in ATTEMPT SUCCESSFUL CHECK OPERATION 220, flow moves directly to ENTIRE SUCCESS HISTORY FILE ATTEMPTED CHECK OPERATION 222.

In ENTIRE SUCCESS HISTORY FILE ATTEMPTED CHECK OPERATION 222, a determination is made as to whether the entire success history file has been attempted. More particularly, if an attempt to obtain malicious code protection update information from every verified IP address in the success history file, e.g., success history file 144, has been unsuccessfully made, a determination is made that the entire success history file has been attempted. Conversely, if an attempt to obtain malicious code protection update information has not been made from at least one verified IP address in the success history file, a determination is made that the entire success history file has not been attempted.

If a determination is made that the entire success history file has been attempted, flow moves from ENTIRE SUCCESS HISTORY FILE ATTEMPTED CHECK OPERATION 222 to a PROVIDE ERROR NOTIFICATION OPERATION 224. Conversely, if a determination is made that the entire success history file has not been attempted, flow returns from ENTIRE SUCCESS HISTORY FILE ATTEMPTED CHECK OPERATION 222 to OBTAIN VERIFIED IP ADDRESS FROM SUCCESS HISTORY FILE OPERATION 216.

Accordingly, if an attempt to obtain malicious code protection update information has not been made from at least one verified IP address in the success history file, an unattempted verified IP address is selected from the success history file in OBTAIN VERIFIED IP ADDRESS FROM SUCCESS HISTORY FILE OPERATION 216. In accordance with one embodiment, an unattempted verified IP address is a verified IP address in the success history file from which an attempt to obtain malicious code protection update information has not been made.

Operations 218, 220, 221, 222 are repeated for each unattempted verified IP address until a determination is made that the attempt was successful in ATTEMPT SUCCESSFUL CHECK OPERATION 220 or a determination is made that the entire success history file has been attempted in ENTIRE SUCCESS HISTORY FILE ATTEMPTED CHECK OPERATION 222.

To illustrate, in one embodiment, the success history file consists of a first verified IP address and a second verified IP address. If a determination is made that the attempt to obtain malicious code protection update information from the first verified IP address is unsuccessful in ATTEMPT SUCCESSFUL CHECK OPERATION 220, and a determination is made that an attempt to obtain malicious code protection update information from the second IP address has not been made in ENTIRE SUCCESS HISTORY FILE ATTEMPTED CHECK OPERATION 222, flow moves to OBTAIN VERIFIED IP ADDRESS FROM SUCCESS HISTORY FILE OPERATION 216.

In accordance with this embodiment, the second verified IP address is selected from the success history file. Operations 218, 220 are performed on the second verified IP address in a manner similar to that discussed above. Upon a determination that the attempt to obtain malicious code protection update information from the second verified IP address is unsuccessful in ATTEMPT SUCCESSFUL CHECK OPERATION 220, a determination is made that the entire success history file has been attempted in ENTIRE SUCCESS HISTORY FILE ATTEMPTED CHECK OPERATION 222, and flow moves to PROVIDE ERROR NOTIFICATION OPERATION 224.

In PROVIDE ERROR NOTIFICATION OPERATION 224, an error notification is provided. In one embodiment, a notification is provided, e.g., to a user of host computer system 102 and/or administrator, that the malicious code protection update information is unobtainable. From PROVIDE ERROR NOTIFICATION OPERATION 224, flow moves to and exits at EXIT OPERATION 226.

Although obtaining of malicious code protection update information is discussed above, in light of this disclosure, those of skill in the art will understand that embodiments in accordance with the present invention are applicable to any situation where the target of the download can be validated, e.g., through a digital signature.

Referring again to FIG. 1, update protection application 106 is in computer memory 114. As used herein, a computer memory refers to a volatile memory, a non-volatile memory, or a combination of the two.

Although update protection application 106 is referred to as an application, this is illustrative only. Update protection application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention may be carried out using any suitable means and/or hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a storage medium configured to store or transport computer readable code in accordance with an embodiment of the present invention. Some examples of computer program product storage mediums are CD-ROM discs (CDs), DVDs, ROM cards, floppy discs, magnetic tapes, and computer hard drives. Servers are on a network and signals transmitted over a network representing computer readable code.

As illustrated in FIG. 1, this medium may belong to the computer system itself. However, the medium also may be removed from the computer system. For example, update protection application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server computer system 130 is a portable computer, a workstation, a two-way pager, a cellular telephone, a digital wireless telephone, a personal digital assistant, a server computer, an Internet appliance, or any other device that includes components that can execute the update protection functionality in accordance with at least one of the embodiments as described herein. Similarly, in another embodiment, host computer system 102 and/or server computer system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the update protection functionality in accordance with one embodiment of the present invention can be implemented in a wide variety of computer system configurations. In addition, the update protection functionality could be stored as different modules in memories of different devices. For example, update protection application 106 could initially be stored in server computer system 130, and then as necessary, a portion of update protection application 106 could be transferred to host computer system 102 and executed on host computer system 102. Consequently, part of the update protection functionality would be executed on processor 134 of server computer system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, update protection application 106 is stored in memory 136 of server computer system 130. Update protection application 106 is transferred over network 126 to memory 114 in host computer system 102. In this embodiment, network interface 138 and I/O interface 110 would include analog modems, digital modems, or a network interface card. If modems are used, network 126 includes a communications network, and update protection application 106 is updated via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
    obtaining an update name from an update name list on a host computer system comprising a processor, said update name list comprising domain names of sites that distribute update information for protecting said host computer system;
    resolving an Internet Protocol address of said update name;
    attempting to obtain said update information from a server computer system located at said Internet Protocol address;
    determining whether said attempting is successful comprising determining whether integrity of said update information is verified comprising determining whether a signature of a sender of said update information is valid, wherein upon a determination that said attempting is successful, said method further comprising updating a success history file comprising adding a record comprising said Internet Protocol address to said success history file, said success history file is stored in a computer readable storage medium;
    wherein upon a determination that said attempting is not successful, said method further comprising determining whether entire update name list has been attempted, wherein upon a determination that said entire update name list has been attempted, said method further comprising obtaining a verified Internet Protocol address from said success history file;
    attempting to obtain said update information from a server computer system located at said verified Internet Protocol address;
    determining whether said attempting to obtain said update information from said server computer system located at said verified Internet Protocol address is successful;
    wherein upon a determination that said attempting to obtain said update information from said server computer system located at said verified Internet Protocol address is successful, said method further comprising updating said success history file;
    wherein upon a determination that said attempting to obtain said update information from said server computer system located at said verified Internet Protocol address is not successful, said method further comprising removing said verified Internet Protocol address from said success history file; and
    determining whether said success history file has entirely been attempted, wherein upon a determination that said success history file has not entirely been attempted, said method further comprising selecting an unattempted verified Internet Protocol address from said success history file.

2. The method of claim 1 wherein said determining whether said attempting is successful further comprises determining whether said update information is obtained.

3. The method of claim 2 wherein upon a determination that said update information is obtained and that said integrity of said update information is verified, a determination is made that said attempting is successful.

4. The method of claim 2 wherein upon a determination that said update information is not obtained, a determination is made that said attempting is not successful.

5. The method of claim 1 wherein upon a determination that said integrity of said update information is not verified, a determination is made that said attempting is not successful.

6. The method of claim 1 wherein said determining whether the integrity of said update information is verified comprises determining whether said update information is outdated.

7. The method of claim 1 wherein said determining whether the integrity of said update information is verified comprises determining whether a hash of said update information is valid.

8. The method of claim 1 wherein said update information is obtained from said server computer system at said Internet Protocol address.

9. The method of claim 8 wherein said record further comprises a timestamp of when said update information was obtained.

10. The method of claim 1 wherein said updating said success history file comprises adding a record to said success history file, said record comprising said verified Internet Protocol address.

11. The method of claim 10 wherein said record further comprises a timestamp of when said update information was obtained from said server computer system located at said verified Internet Protocol address.

12. The method of claim 1 wherein said updating said success history file comprises modifying a record of said success history file, said record comprising said verified Internet Protocol address.

13. The method of claim 12 wherein said modifying comprises updating a timestamp of said record.

14. The method of claim 1 wherein upon a determination that said success history file has entirely been attempted, said method further comprising providing an error notification.

15. The method of claim 1 further comprising attempting to obtain said update information from said unattempted verified Internet Protocol address.

16. A system comprising:
a memory;
a processor coupled to said memory;
means for obtaining an update name from an update name list on a host computer system, said update name list comprising domain names of sites that distribute update information for protecting said host computer system;
means for resolving an Internet Protocol address of said update name;
means for attempting to obtain said update information from a server computer system located at said Internet Protocol address;
means for determining whether said attempting is successful comprising a means for determining whether an integrity of said update information is verified comprising means for determining whether a signature of a sender of said update information is valid;
means for updating a success history file upon a determination that said attempting is successful comprising means for adding a record comprising said Internet Protocol address to said success history file;
means for determining whether entire update name list has been attempted upon a determination that said attempting is not successful;
means for obtaining a verified Internet Protocol address from said success history file upon a determination that said entire update name list has been attempted;
means for attempting to obtain said update information from a server computer system located at said verified Internet Protocol address;
means for determining whether said attempting to obtain said update information from said server computer system located at said verified Internet Protocol address is successful;
means for updating said success history file upon a determination that said attempting to obtain said update information from said server computer system located at said verified Internet Protocol address is successful;
means for removing said verified Internet Protocol address from said success history file upon a determination that said attempting to obtain said update information from said server computer system located at said verified Internet Protocol address is not successful;
means for determining whether said success history file has entirely been attempted; and
means for selecting an unattempted verified Internet Protocol address from said success history file upon a determination that said success history file has not entirely been attempted.

17. A computer-program product comprising a computer readable storage medium containing computer program code comprising:
an update protection application for obtaining an update name from an update name list on a host computer system, said update name list comprising domain names of sites that distribute update information for protecting said host computer system;
said update protection application for resolving an Internet Protocol address of said update name;
said update protection application for attempting to obtain said update information from a server computer system located at said Internet Protocol address;
said update protection application for determining whether said attempting is successful comprising determining whether an integrity of said update information is verified comprising determining whether a signature of a sender of said update information is valid;
said update protection application further for updating a success history file upon a determination that said attempting is successful comprising adding a record comprising said Internet Protocol address to said success history file;
said update protection application further for determining whether entire update name list has been attempted upon a determination that said attempting is not successful;
said update protection application further for obtaining a verified Internet Protocol address from said success history file upon a determination that said entire update name list has been attempted;
said update protection application further for attempting to obtain said update information from a server computer system located at said verified Internet Protocol address;
said update protection application further for determining whether said attempting to obtain said update information from said server computer system located at said verified Internet Protocol address is successful;
said update protection application further for updating said success history file upon a determination that said attempting to obtain said update information from said server computer system located at said verified Internet Protocol address is successful;
said update protection application further for removing said verified Internet Protocol address from said success history file upon a determination that said attempting to obtain said update information from said server computer system located at said verified Internet Protocol address is not successful;
said update protection application further for determining whether said success history file has entirely been attempted; and
said update protection application further for selecting an unattempted verified Internet Protocol address from said success history file upon a determination that said success history file has not entirely been attempted.

18. A computer system comprising:
a memory having stored therein an update protection application; and
a processor coupled to said memory, wherein execution of said update protection application generates a method comprising:
obtaining an update name from an update name list on a host computer system, said update name list comprising domain names of sites that distribute update information for protecting said host computer system;
resolving an Internet Protocol address of said update name;
attempting to obtain update information from a server computer system located at said Internet Protocol address;
determining whether said attempting is successful comprising determining whether integrity of said update information is verified comprising determining whether a signature of a sender of said update information is valid, wherein upon a determination that said attempting is successful, said method further comprising updating a success history file comprising adding a record comprising said Internet Protocol address to said success history file;
wherein upon a determination that said attempting is not successful, said method further comprising determining whether entire update name list has been attempted, wherein upon a determination that said entire update name list has been attempted, said method further comprising obtaining a verified Internet Protocol address from said success history file;

attempting to obtain said update information from a server computer system located at said verified Internet Protocol address;

determining whether said attempting to obtain said update information from said server computer system located at said verified Internet Protocol address is successful;

wherein upon a determination that said attempting to obtain said update information from said server computer system located at said verified Internet Protocol address is successful, said method further comprising updating said success history file;

wherein upon a determination that said attempting to obtain said update information from said server computer system located at said verified Internet Protocol address is not successful, said method further comprising removing said verified Internet Protocol address from said success history file; and determining whether said success history file has entirely been attempted, wherein upon a determination that said success history file has not entirely been attempted, said method further comprising selecting an unattempted verified Internet Protocol address from said success history file.

* * * * *